United States Patent [19]
Curry et al.

[11] 3,951,674
[45] Apr. 20, 1976

[54] CONCRETE ADDITIVE

[75] Inventors: John D. Curry, Oxford; Francis L. Diehl, Cincinnati; Joseph P. Nirschl, Fairfield, all of Ohio

[73] Assignee: The Procter & Gamble Company, Cincinnati, Ohio

[22] Filed: Dec. 17, 1974

[21] Appl. No.: 533,739

[52] U.S. Cl. ........................... 106/88; 106/92; 106/93; 106/97; 106/314
[51] Int. Cl.² .......................................... C04B 7/353
[58] Field of Search .............. 106/92, 93, 97, 86, 106/87, 88, 314, 315

[56] References Cited
UNITED STATES PATENTS

| | | | |
|---|---|---|---|
| 2,353,372 | 7/1944 | Stone | 106/93 |
| 2,771,953 | 11/1956 | Kaveler | 106/93 |
| 2,995,189 | 8/1961 | Cutforth | 106/93 |
| 3,788,869 | 1/1974 | Batdorf et al. | 106/93 |

*Primary Examiner*—J. Poer
*Attorney, Agent, or Firm*—Jerry J. Yetter; Julius P. Filcik; Richard C. Witte

[57] ABSTRACT

Cementitious concrete compositions with improved compressive strength comprising a cellulose acetate sulfate set-retarding compressive strength increasing agent are provided.

8 Claims, No Drawings

CONCRETE ADDITIVE

BACKGROUND OF THE INVENTION

This invention relates to cements and to improved concrete compositions comprising said cements in combination with a set-retarding compressive strength increasing agent, an aggregate mixture, optional air-entraining admixtures, sufficient water to provide desirable workability and, optionally, other concrete additives. More particularly, the compositions herein are characterized by increased compressive strength afforded by the presence of cellulose acetate sulfate therein.

Cement is one of the most widely used materials in construction. Concrete is composed of cement; "aggregate" which comprises sand, gravel or broken stone, etc.; and various optional additives which modify or impart desirable characteristics or properties to the concrete. In general, concrete comprises about one volume of cement to two volumes of sand and four volumes of stone. These ratios can be varied, depending on the strength and other structural parameters desired.

Cement, itself, is a powdery complex calcined mixture of various inorganic calcium, aluminate and silicate compounds which can be made into a paste with water and which will cure or "set" into a solid mass when allowed to stand. In general terms, concrete is cement-plus-aggregate. Hydraulic cements are most commonly used to prepare concrete. The use of hydraulic cements of one form or another has been known since the Mesopotamian era and the age of early Egypt. Various limes were also employed by the early Greeks and later by the Romans as the principal component in cements and concrete.

It has now been found that the use of cellulose acetate sulfate in cement and concrete (or mortar) compositions provides a significant improvement in the compressive strength properties thereof after setting.

It is well-known that hydraulic cement mixtures (and concrete prepared therefrom) require excess water to be workable. This excess of water results in an overall decrease in strength. Thus, concrete compositions which are workable, yet which require only a small amount of water, are desirable. This desirable "water reduction" attribute is secured by means of the cellulose acetate sulfate additives herein. The present additives serve a two-fold purpose: (1) to retard the setting rate, thus prolonging the use life; (2) to lubricate the cement and aggregate particles so that they exhibit improved flow characteristics and require lesser amounts of water during the mixing and molding operation, thereby enhancing the strength of the cured cement or concrete.

The modification of cements and concretes by means of various starches and cellulosics to achieve slow setting or increased workability at lower water concentrations is well-known.

U.S. Pat. No. 2,795,508, Kaveler, Sulfoalkyl Cellulose Ethers and Their Salts as Hydraulic Natural Cement Set Retarders, June 11, 1957, discloses a cement composition having set-retarding properties containing a sulfoalkyl cellulosic ether salt compound as an additive.

U.S. Pat. No. 2,995,189, Cutforth, Hydraulic Cements having an Extended Thickening Time, Methods of Making the Same, and Processes Employing the Same, Aug. 8, 1961, relates to cement compositions containing a set-retarder additive composition comprising a mixture of non-acetylated acid cellulose sulfate and its salts and carboxymethyl hydroxyethyl cellulose mixed ether and its salts.

U.S. Pat. No. 3,753,748, Martin, Hydraulic Cement Retarder Composition, Aug. 21, 1973, relates to hydraulic cement slurries containing as a set-retarding additive a synergistic mixture of an alkali metal, alkaline earth metal, or alkali metal-alkaline earth metal salt of a lignosulfonic acid in combination with boric acid or a borate.

U.S. Pat. No. 2,880,096, Hurely, Cement Compositions and Process of Cementing Wells, Mar. 31, 1959, discloses a hydraulic cement admixture containing carboxyalkyl hydroxyethyl cellulose mixed ethers and salts thereof and an alkali metal aluminate as a composition which reduces the water needed in the slurry while accelerating setting time.

U.S. Pat. No. 3,788,869, Batdorf, et al., Concrete Compositions or Mixes and Additives Therefor, Jan. 29, 1974, relates to readily pumpable concrete compositions containing cellulosics.

As can be seen from the foregoing, there is a continuing search for methods to improve cement and concrete compositions using various additives which provide set modifying benefits and which impart improved strength thereto.

It is an object of the present invention to provide improved cement containing an additive which increases the compressive strength of the hardened cement and concrete (or mortar) made therefrom.

Another object of this invention is to provide a cement additive which retards the set rate of the cement, or concrete made therefrom, without adversely affecting the properties thereof.

A further object is to provide low water content cement or concrete compositions which are readily workable and which exhibit enhanced strength and durability on curing.

In a preferred mode, the present invention encompasses the use of an air-entraining additive which imparts improved freeze/thaw characteristics and additional workability to the aforesaid improved concrete mixtures.

These and other objects are obtained herein as will be seen from the following disclosures.

SUMMARY OF THE INVENTION

The present invention encompasses cement compositions comprising a hydraulic cement and a water-soluble cellulose acetate sulfate additive (as described more fully hereinafter) at a cement:additive weight ratio in the range of 100:0.30 to 100:2.0, preferably 100:0.4 to 100:0.6.

The invention also encompasses concrete (or mortar) compositions comprising:

a. from about 10% to about 30% (wt.) of a hydraulic cement;

b. from about 70% to about 90% (wt.) of aggregate;

c. from about 0.30% to 2.0% (wt. - based on cement) of water soluble cellulose acetate sulfate additive; and d. from about 0% to about 0.1% (wt.-based on cement) of air-entraining admixture, i.e., sufficient to provide an air content of from about 3% to about 9% (volume) in concrete.

In use, the composition will contain water in an amount sufficient to provide workability.

DETAILED DESCRIPTION OF THE INVENTION

The components of the present compositions are described in detail, below.

The basic structure of the cellulose acetate sulfate used in the present compositions can be depicted as follows, wherein n is an integer in the range of from about 100 to about 10,000. The cellulose acetate sulfates are prepared by acetylating a cellulose feedstock, e.g., cotton linters, using acetyl chloride. The acetylated cellulose is thereafter reacted with $SO_3$ and neutralized with base. Neutralization can be carried out with any base, but for the present purposes the base must be one that results in a water-soluble cellulose compound. The alkali metal hydroxides, e.g., $Na^+$, $K^+$ and the ammonium and amine or alkanolamine bases are used herein. Sodium hydroxide is preferred, but potassium hydroxide, triethanolamine, dimethylamine, diethanolamine, and the like, can also be used. In each instance, the counterion on the cellulose acetate sulfate compound will correspond to the cation of the base used in the neutralization reaction. The sodium cellulose acetate sulfate preferred for use herein is manufactured by the Eastman Chemical Company and marketed commercially under the trade name Sulfacel, and is depicted in the Eastman bulletin 54-1979, as follows:

cement in its dry state, comprises: (a) from about 25% to about 60% (wt.) tricalcium silicate; (b) from about 7% to about 50% (wt.) dicalcium silicate; (c) from about 4% to about 11% (wt.) tricalcium aluminate; (d) from about 8% to about 13% (wt.) calcium aluminoferrite; (e) from about 0.1% to about 1.5% (wt.) lime; and (f) other minor impurities. During the heating procedure used to form the above composition, a fluxing agent is normally present, and this can cause the chemical make-up of the final composition to vary somewhat. In the above formulation, tricalcium aluminate and calcium aluminoferrite are the fluxing agents.

Concrete, as used herein, includes a mixture of coarse or fine aggregates and hydraulic cement at a weight ratio of cement:aggregate of 1:2.3 to 1:9, preferably 1:3 to 1:7, said concrete optionally containing admixtures which impart desirable properties thereto. (The term "mortar" as used herein is broadly encompassed by the term "concrete", inasmuch as mortar is cement-plus-fine aggregate such as sand.) Suitable aggregates include both coarse and fine materials classified according to size, weight and density. Gravel, granite, limestone, and quartz sieve are classified as coarse aggregates, while sand, fly ash, and the like are classified as fine aggregates. Preferred concrete compositions of the present invention employ an aggregate

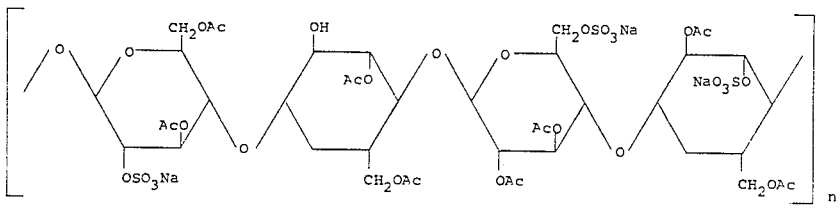

The term "cement" as used herein encompasses only the inorganic hydraulic cements and is not intended to include the various organic adhesives such as glues, pastes, mucilages, and the like, loosely called "cement". (A "hydraulic" cement is one which is capable of being set and hardened by the action of water). A great variety of hydraulic cements which contain various proportions of finely-ground lime, alumina, silica, and iron oxide that will hydrate and set to a solid mass are known in standard texts. Representative examples of such cements include hydraulic limes, grappier cements, pozzolan cements, natural cements and Portland cements. Portland cement is the most widely used hydraulic cement because of its strength characteristics, and is a preferred cement for use herein.

In particular, hydraulic cements of the Portland type include quick setting Portland cement, white Portland cement, water-proofed Portland cements, Kühl cements, Ferrari cements, and air-entraining Portland cements, and these are widely used and accepted in the construction industry. Other cements are classified according to their intended use such as oil well cements and masonry cements.

Portland cement is a bluish-gray powder obtained by finely grinding the clinker obtained by heating a mixture of calcareous and argillaceous materials. The principal components comprise a mixture of high-calcium limestone and clay or shale. More specifically, Portland comprising from about 20% to about 60% fine aggregate and from about 40% to about 80% coarse aggregate, and optimally have a weight ratio range of fine to coarse aggregate of from about 1:0.67 to about 1:4. Sand and gravel are preferred for use as the aggregate, especially sand and gravel mixtures in a weight ratio of sand-gravel from about 1:2.1 to 1:2.9.

The entrainment of small amounts of air in cement and concrete mixes is advantageous for counteracting certain undesirable effects of extreme temperature changes on hardened concrete. Conventional methods and procedures for manufacturing concrete and cement compositions normally result in the entrainment of some air therein. Another method of entraining air into cement and concrete mixes consists of adding known air entrainment agents to the mixture, and such agents are useful herein. Air entrainment agents which are suitable for use in the present compositions include, for example, vinsol resin, beef tallow, and alkali salts of sulfated and sulfonated organic compounds, or combinations thereof. Freeze/thaw protection is greatly increased when a minimun of about 2% air (by volume) is present in concrete. Freeze/thaw stability is attained because expansive forces are dissipated by the air bubbles in the concrete. However, the added air decreases the compressive strength of the concrete; therefore, excessive air entrainment is to be avoided. An average air content of about 3–9% (volume) in concrete is recommended, depending on mix design and desired specifications.

TEST PROCEDURE

Mortar

Using the American Society for Testing and Materials (ASTM) book of standards as a guide, a procedure was developed to screen, test and evaluate the instant cement and concrete mixtures.

The mixing procedure for mortar testing was carried out according to ASTM Designation: C 305-65 (Reapproved 1970), with certain modifications. The ASTM standard mixing procedure calls for a 15 second rest period after the initial mixing and prior to the final mixing. This period was lengthened to 90 seconds in the present tests on mortar.

The mixing procedure for compressive samples was altered to include enough material to make tensile samples from the same batch, thus eliminating the separate hand mixing for tensile specimens required by ASTM Designation: C 190-72. Standardized compressive strength samples were made from a mixture of 1 part Type I Portland cement to 2.75 parts silica sand crystals.

The test for air content of Hydraulic Cement Mortar ASTM Designation: C 185-71, was done with a Chase Air Indicator. A Chase Air Indicator is a graduated cylinder into which a given volume of mortar is placed. The mortar is then contacted with a given volume of solvent. The air content of the concrete is determined by subtracting the volume of mortar and solvent before bringing them into contact with each other from the volume of mortar and solvent after contact is made. It was determined that each division of the Chase Air Indicator is equivalent to 1.5% - 1.8% air content. Utilizing this method, it was possible to quickly and effectively measure the air content of the mortar mix.

The setting time of the mix was determined using a Vicat apparatus in a manner similar to ASTM Designation: C 191-71. Setting time (initial) is the amount of time required for the sample to harden sufficiently to give 25 mm penetration in 30 seconds by the Vicat probe.

Plastic consistency of the samples was determined using as guides ASTM Designation: C 230-68 and ASTM Designation: C 190-73. A standard flow table was used to monitor the plastic consistency of the mortar mix. The normal procedure used for flow determination is to mold a cylinder of mortar on the flow table top and then drop the table a distance of ½ inch 25 times in 15 seconds. A flow of 100% ± 10% was achieved with mixes used to make compressive strength samples.

Compressive strength preparations were placed into two-inch cube molds similar to the procedure set-forth in ASTM Designation: C 190-73; each of two layers was compacted 32 times. The samples were then stored in a moisture cabinet for 24 hours, after which time they were stripped from the molds and placed in a saturated lime water bath for six days. The samples were then tested on a Versa-Tester for compressive strength seven days after the initial mixing of the sample.

Concrete

Concrete samples were prepared and tested according to the following procedures. All concrete mixtures were proportioned according to ACI Designation: 211.1-70.

The concrete mixtures were prepared in accordance with ASTM Designation: C 494, which stipulates that test mixes be made with and without the chemical additive to be tested so that a comparison of the concrete mix containing the additive can be made with a control sample without the additive.

Mixing of the concrete was accomplished in an open-bowl laboratory mixer. The concrete was mixed for two minutes, allowed to stand for three minutes, and remixed for one minute, in accordance with ASTM Designation: C 192.

Immediately after mixing, one slump test and one air content test were taken according to ASTM Designations: C 143 and C 231. The net water content of the mix was calculated and observations of the time-of-set (ASTM Designation: C 403) were made. Unit weight tests were performed on the test samples in accordance with ASTM Designation: C 138.

Standard-size test cylinders, 6 inches in diameter and 12 inches high, were prepared from each mix; ASTM Designation: C 192, was followed.

Four of the cylinders were subsequently capped and tested for compressive strength (ASTM Designation: C 39). Two samples were tested after 7 days moist curing and the other two after 28 days moist curing.

Mortar and concrete mixtures in the following examples were formulated and tested in accordance with the foregoing methods and procedures. The examples further describe and illustrate the present invention, but are not to be construed as being limiting thereof.

EXAMPLE I

A standardized compressive strength test using a well-defined mortar was carried out under the ASTM guidelines set-forth above.

A mortar mixture consisting of 1 part Type I Portland Cement and 2.75 parts sand (Ottawa Silica Sand Crystals) and having a water:cement weight ratio of 0.50 was formulated and tested for compressive strength. A compressive strength increase of about 23% over a control sample was noted when 0.5% (wt. of cement) sodium cellulose acetate sulfate was added to the mortar mixture.

EXAMPLE II

A typical concrete containing the instant sodium cellulose acetate sulfate is as follows.

Control and test samples of Portland Cement were proportioned according to the Recommended Practice for Selecting Proportions for Concrete (ACI) and tested according to ASTM procedures.

The cement used was Portland Cement obtained from the Southwestern Portland Cement Company at Fairborn, Ohio, sold commercially under the trade name "Miami" and which conformed to ASTM Type I Portland Cement.

The coarse aggregate used was a high quality limestone with low absorption, approved for use in Portland Cement Concrete by the Kentucky Bureau of Highways in accordance with grading requirements for "No. 57" stone with a nominal size of 1 inch to No. 4 sieve. The aggregate had a bulk specific gravity of 2.73 with the saturated surface dry, and an absorption of 0.64%. The coarse aggregate was obtained from the Central Rock Company in Lexington, Kentucky.

The fine aggregate used consisted of a natural sand approved for use by the Kentucky Bureau of Highways and obtained from the Ohio River near Milton, Kentucky. The fine aggregate had a bulk specific gravity of 2.64 with the saturated surface dry, an absorption of 1.96% and a fineness modulus of 2.83.

The air-entraining admixture used was neutralized Vinsol Resin, a natural wood resin neutralized with sodium hydroxide. Vinsol Resin was added to the Portland Cement Concrete mixture to give the final composition a 3-5% volume air content. Mixtures of the following compositions were tested and evaluated for compressive strength increase.

A typical mixture was as follows (parts by weight): Portland Cement - 517; fine aggregate - 3147; coarse aggregate - 1748; water - 270. Control and test samples were prepared. Sodium cellulose acetate sulfate was added to the test sample.

Immediately after mixing, the slump and air content were measured. Standard size cylinders (6 inches diameter × 12 inches height) were made from each mix. Four of the cylinders were subsequently capped and and tested for compressive strength. The results were as follows:

Table 1

| Cement Mixture | Water:Cement Ratio | Compressive Strength % Admixture | Slump | 7 days | 28 days |
| --- | --- | --- | --- | --- | --- |
| Control | 0.522 | — | 2¾" | 3335 (PSI) | 4609 (PSI) |
| Control + sodium cellulose acetate sulfate | 0.452 | 0.5% (wt. of cement) | 3⅛" | 4547 (PSI) | 5556 (PSI) |

As can be seen from the foregoing, the sodium cellulose acetate sulfate substantially increased the compressive strength of the test concrete sample over the control.

In the foregoing procedure, the sodium cellulose acetate sulfate is replaced by an equivalent amount of the following cellulose acetate sulfates, respectively, and equivalent results are secured: $K^+$ salt; $NH_4^+$; triethanol ammonium salt.

Cement and concrete samples prepared in the foregoing manner also exhibit satisfactory tensile strength, setting time, and freeze/thaw stability.

What is claimed is:

1. A cementitious composition having improved compressive strength, comprising a hydraulic cement and a water-soluble cellulose acetate sulfate additive at a cement: additive weight ratio in the range of 100:0.30 to 100:2.0.

2. The composition of claim 1 wherein the cement is Portland Cement.

3. The composition of claim 1 wherein the water-soluble cellulose acetate sulfate additive is sodium cellulose acetate sulfate.

4. A composition according to claim 1, comprising:
   a. from about 10% to about 30% (wt.) of a hydraulic cement;
   b. from about 70% to about 90% (wt.) of aggregate;
   c. from about 0.30% to about 2.0% (wt. - based on cement) of a water-soluble cellulose acetate sulfate additive; and
   d. from about 0% to about 0.1% (wt.) air-entraining admixture.

5. The cementitious composition of claim 4 wherein the hydraulic cement is a Portland Cement.

6. The cementitious composition of claim 5 wherein the water-soluble cellulose acetate sulfate additive is in the sodium salt form.

7. The cementitious composition of claim 5 wherein the aggregate comprises sand, gravel, or mixtures thereof.

8. The composition of claim 4 comprising a natural wood resin air entraining admixture in sufficient quantity to produce an air content of about 3% to 9% (volume).

* * * * *